United States Patent [19]
Sano

[11] Patent Number: 5,298,983
[45] Date of Patent: Mar. 29, 1994

[54] SMALL, HIGH-RESOLUTION COLOR DISPLAY APPARATUS

[75] Inventor: Akira Sano, Nagaokakyo, Japan

[73] Assignee: Mitsubishi Denki Kabushiki Kaisha, Tokyo, Japan

[21] Appl. No.: 801,929

[22] Filed: Dec. 3, 1991

[30] Foreign Application Priority Data

Dec. 12, 1990 [JP] Japan ................................ 2-401659
Jun. 17, 1991 [JP] Japan ................................ 3-144716

[51] Int. Cl.⁵ ...................... H04N 9/24; H04N 9/31; H04N 9/12
[52] U.S. Cl. ..................................... 348/557; 348/808
[58] Field of Search ............... 358/56, 60, 64, 217, 358/224, 166; H04N 9/12, 9/16, 9/18, 9/31

[56] References Cited

U.S. PATENT DOCUMENTS

| 4,301,468 | 11/1981 | Alvarez . | |
| 4,573,081 | 2/1986 | Reeder | 358/60 |
| 4,635,107 | 1/1987 | Turner | 358/64 |
| 4,725,888 | 2/1988 | Hakamada . | |
| 4,977,447 | 12/1990 | Takenaka et al. | 358/64 |
| 4,999,703 | 3/1991 | Henderson | 358/60 |

FOREIGN PATENT DOCUMENTS

| 1439003 | 4/1966 | France . |
| 2490910 | 9/1981 | France . |
| 56-160744 | 12/1981 | Japan . |
| 62-216595 | 9/1987 | Japan . |
| 2-67893 | 3/1990 | Japan . |
| 2157911A | 10/1985 | United Kingdom . |

Primary Examiner—Stephen Brinich

[57] ABSTRACT

Red, green, and blue signals are extracted from a composite video signal, compressed on the time axis, combined into a single RGB video signal, and displayed as three separate monochrome pictures on a single cathode-ray tube. Red, green, and blue light from the monochrome pictures is combined into a single color picture. If necessary, the color are optically enlarged to the correct aspect ratio.

19 Claims, 8 Drawing Sheets

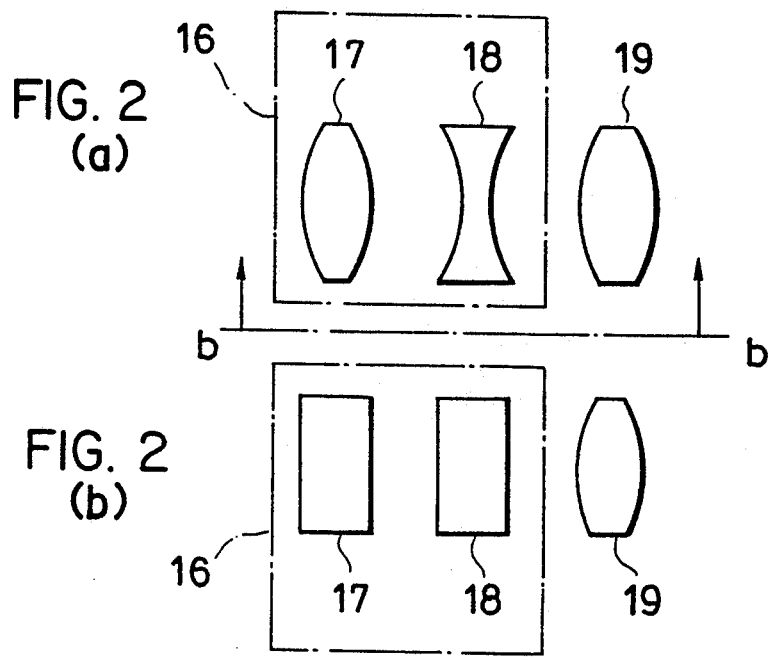
FIG. 2 (a)
FIG. 2 (b)
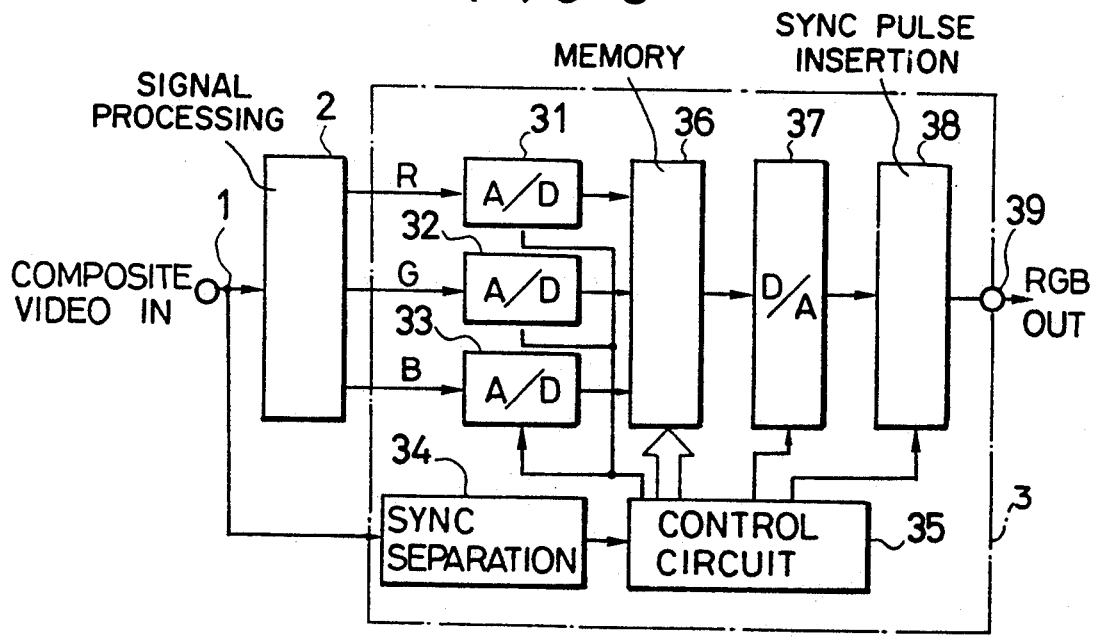
FIG. 3

SMALL, HIGH-RESOLUTION COLOR DISPLAY APPARATUS

BACKGROUND OF THE INVENTION

This invention relates to small, high-resolution color display apparatus suitable for use, for example, as the viewfinder of a hand-held video camera with a built-in video cassette tape recorder, commonly known as a camcorder.

The viewfinders of early camcorders generally displayed black-and-white pictures on small monochrome cathode-ray tubes. Such tubes provide satisfactory resolution even on a screen of viewfinder size, measuring about 20 millimeters diagonally. However, one problem is that the user cannot see the colors of the scene which he or she is shooting.

Recently viewfinders with color liquid-crystal displays have appeared. High hopes are held for such viewfinders in the future, but at present they are expensive to manufacture and offer only poor resolution: about 300 to 400 pixels in the horizontal direction (only 100 to 130 pixels per primary color) and about 250 pixels in the vertical direction (only half the 500 effective scanning lines of the standard NTSC television scanning system). This resolution is greatly inferior to the resolution of the camera imaging device, and therefore does not enable the user to focus the camera lens accurately.

Color cathode-ray tubes are also low in resolution, owing to their use of different-colored phosphor dots or stripes illuminated through a shadow mask. To achieve higher resolution, a color viewfinder has been proposed that employs three monochrome cathode-ray tubes, one for each of the three primary colors, and combines their images into a single color picture. Such a viewfinder is large and expensive, however, and suffers from color registration error due to differences in picture size and linearity among the three tubes. The registration error can be eliminated only by difficult adjustment of the deflection systems of the three tubes. Further, even if these are precisely adjusted when new, they will tend to get out of adjustment during use.

SUMMARY OF THE INVENTION

It is accordingly an object of the present invention to provide a small, inexpensive, reliable, high-resolution color display apparatus.

The invented color display apparatus has signal-processing means for extracting red, green, and blue signals from a composite video signal. A time-axis compression means compresses the red, green, and blue signals and combines them to create a single RGB video signal in which the red, green, and blue signals appear successively in each horizontal scan. A cathode-ray tube receives the RGB signal and displays the red, green, and blue signals in different areas as a first monochrome picture, a second monochrome picture, and a third monochrome picture. Optical superimposing means combines red light from the first monochrome picture, green light from the second monochrome picture, and blue light from the third monochrome picture into a single color picture.

BRIEF DESCRIPTION OF THE DRAWINGS

FIGS. 2a–2b are more detailed drawings of the image enlarging means and eyepiece lens in FIG. 1.

FIG. 3 is a block diagram illustrating the time-axis compression means in FIG. 1.

DETAILED DESCRIPTION OF THE INVENTION

An embodiment of the invention and several variations will be described with reference to the drawings. The drawings are for illustrative purposes and do not limit the scope of the invention, which should be determined solely from the appended claims.

Figure 1:
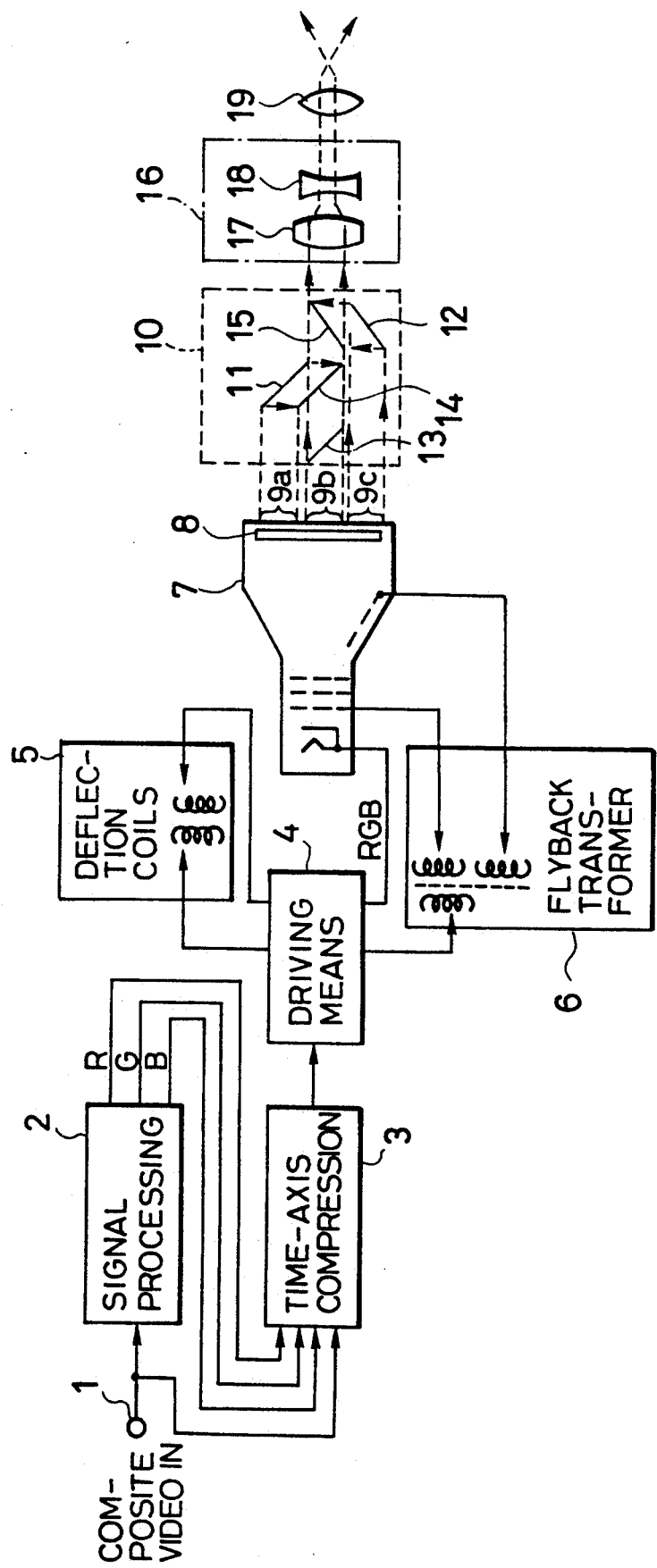
FIG. 1 shows an example of the invented color display apparatus.

Referring to FIG. 1, the invented display apparatus has an input terminal 1 that receives a composite video signal and provides it to a signal-processing means 2 and a time-axis compression means 3. The signal-processing means 2 extracts red, green, and blue signals from the composite video signal and feeds these three signals, marked R, G, and B in the drawing, to the time-axis compression means 3. The time-axis compression means 3 combines these signals into a single RGB video signal which it sends to a cathode-ray-tube driving means 4.

The cathode-ray-tube driving means 4 drives horizontal and vertical deflection coils 5 and a flyback transformer 6 according to the RGB video signal, causing the electron beam of a monochrome cathode-ray tube 7 to scan a phosphor screen 8. The phosphor screen 8 comprises a layer of white phosphor material deposited on the inside surface of the faceplate of the cathode-ray tube 7. The scanning is arranged to form three separate monochrome pictures 9a, 9b, and 9c, derived from the red, green, and blue signals, respectively, aligned in the vertical or horizontal direction on the phosphor screen 8.

The three monochrome pictures 9a, 9b, and 9c are combined by an optical superimposing means 10 having total reflection mirrors 11 and 12, a green-transmitting dichroic mirror 13, a red-reflecting dichroic mirror 14, and a blue-reflecting dichroic mirror 15. The resulting color picture is enlarged to a standard aspect ratio by an image enlarging means 16 comprising convex and concave lenses 17 and 18. The enlarged picture is viewed through an eyepiece lens 19.

As shown in FIG. 2, the lenses 17 and 18 of the image enlarging means 16 are cylindrical in shape. The image enlarging means 16 accordingly enlarges the image in only one direction, in this embodiment the horizontal direction. In variations that will be shown later the picture is enlarged in the vertical direction.

FIG. 3 is a block diagram illustrating one possible structure of the time-axis compression means 3. The red, green, and blue signals from the signal-processing means 2 are fed to respective A/D converters 31, 32, and 33. The composite video signal from the input terminal 1 is fed to a synchronizing signal (sync) separation circuit 34. Synchronizing pulses extracted by the synchronizing signal separation circuit 34 are fed to a control circuit 35 which controls the analog-to-digital (A/D) converters 31, 32, and 33, causing them to write digitized data of the red, green, and blue signals in a memory means 36.

The digital contents of the memory means 36 are converted by a digital-to-analog (D/A) converter 37 to an analog signal, to which synchronizing pulses are added by a synchronizing pulse insertion circuit 38. The resulting signal is the RGB video signal, which is output at an output terminal 39. The memory means 36, the D/A converter 37, and the synchronizing pulse insertion circuit 38 are controlled by the control circuit 35.

Figure 4:
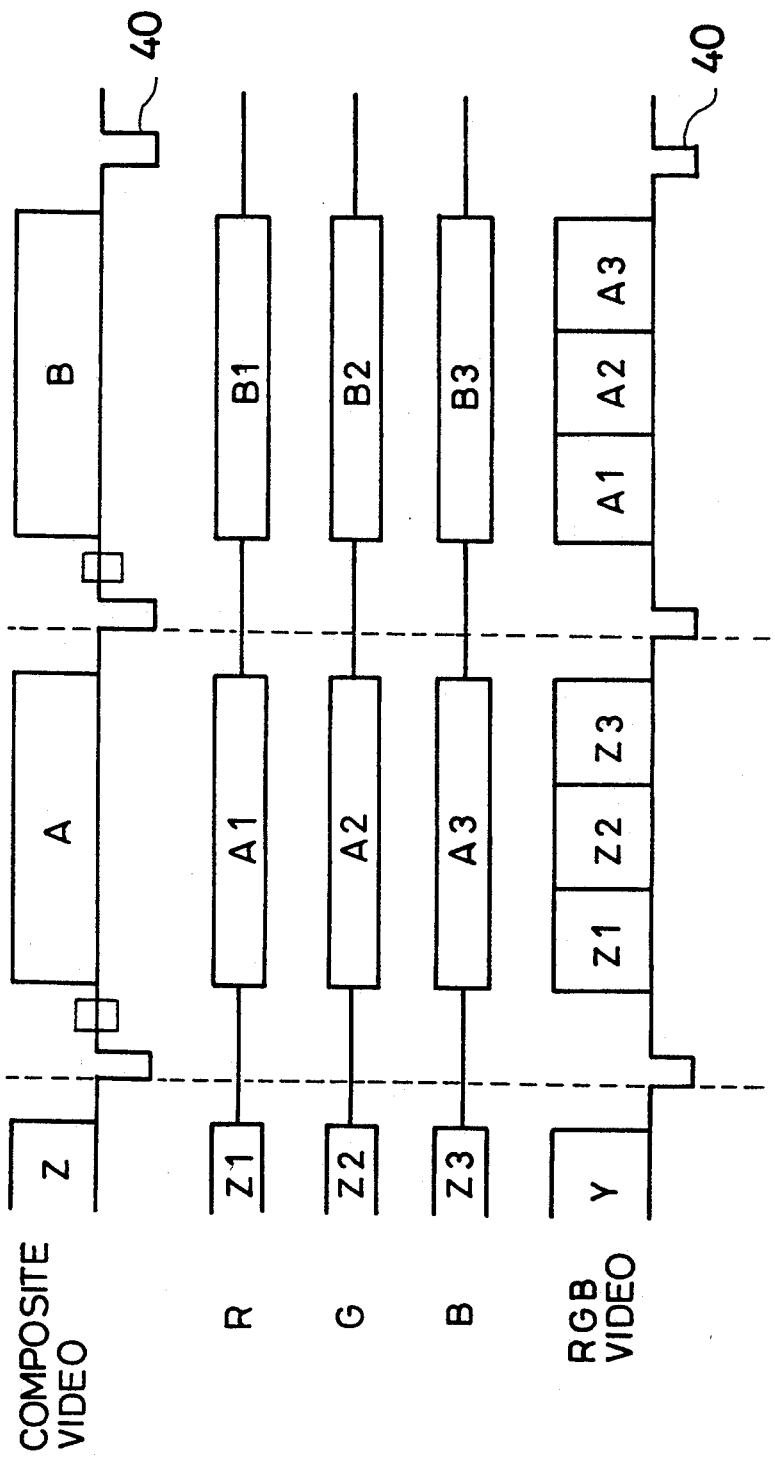
FIG. 4 is a timing diagram illustrating the operation of this time-axis compression means.

The operation of this time-axis compression means 3 will be explained with reference to FIG. 4. As shown at the top of FIG. 4, the composite video signal comprises portions, designated . . . Z, A, B, . . . in the drawing, corresponding to successive horizontal scans of the screen, separated by horizontal synchronizing pulses 40. The red, green, and blue signals output by the signal-processing means 2 likewise comprise portions, designated . . . Zi, Ai, Bi, . . . (i=1, 2, 3) in the drawing, corresponding to successive horizontal scans. The red, green, and blue signals for a given horizontal scan, such as A1, A2, and A3 in FIG. 4, are written simultaneously into three different sections of the memory means 36.

During the next horizontal scan, the signals B1, B2, and B3 are written to another three sections of the memory means 36. At the same time, the stored signals A1, A2, and A3 are read successively from the memory means 36. Reading is performed at triple the writing speed, thus compressing the signals on the time axis. This enables the D/A converter 37 to produce an RGB video signal in which the A1, A2, and A3 portions follow one another in succession in the same horizontal scan period, as illustrated at the bottom of FIG. 4. Horizontal synchronizing pulses 40 and vertical synchronizing pulses (not shown) are added to the RGB video signal by the synchronizing pulse insertion circuit 38.

Figure 5:
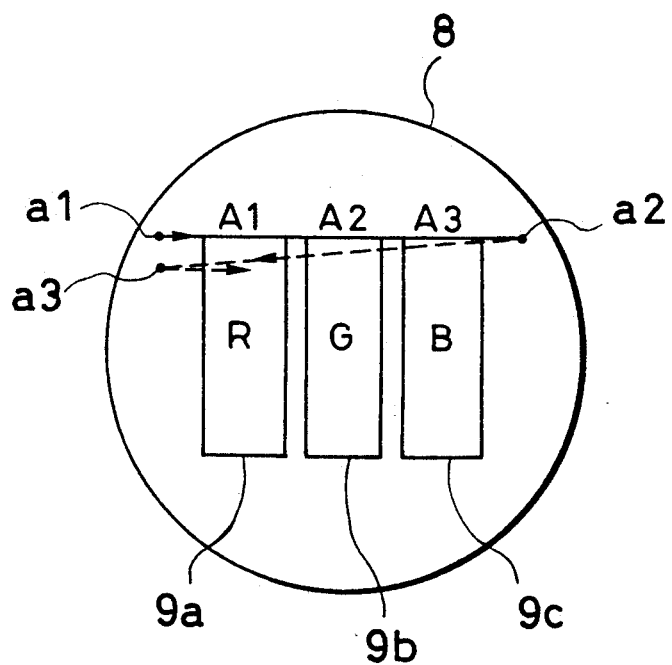
FIG. 5 illustrates one possible disposition of the three monochrome pictures on the phosphor screen in FIG. 1.

FIG. 5 illustrates the operation of the cathode-ray-tube driving means 4, the horizontal and vertical deflection coils 5, the flyback transformer 6 and the cathode-ray tube 7. The electron beam follows a standard scanning pattern starting with a1-a2-a3, causing the A1, A2, and A3 portions of the RGB video signal to be reproduced side-by-side. In this way the three monochrome pictures 9a, 9b, and 9c are built up, aligned in the horizontal direction on the phosphor screen 8. The monochrome picture 9a reproduces an image of the red signal, the monochrome picture 9b reproduces an image of the green signal, and the monochrome picture 9c reproduces an image of the blue signal, but of course all three pictures are black-and-white. The three pictures are compressed in the horizontal direction, having an aspect ratio of 4:9 instead of the standard 4:3.

Referring again to FIG. 1, the three monochrome pictures 9a, 9b, and 9c are combined as follows. White light from the first monochrome picture 9a is reflected from the total reflection mirror 11, then the red component of this light is reflected from the red-reflecting dichroic mirror 14 to the image enlarging means 16, other color components being lost. The green component of the white light from the second monochrome picture 9b is transmitted through the green-transmitting dichroic mirror 13 to the image enlarging means 16, other color components being lost. White light from the third monochrome picture 9c is reflected by the total reflection mirror 12, then the blue component of this light is reflected by the blue-reflecting mirror 15 to the image enlarging means 16, other color components being lost.

In this way primary colors from the three monochrome pictures 9a, 9b, and 9c are superimposed to create a color picture with a 4:9 aspect ratio. The image enlarging means 16 enlarges this color picture by a factor of three in the horizontal direction, creating a color picture with the standard 4:3 aspect ratio which is viewed through the eyepiece lens 19.

The display apparatus in FIG. 1 can be small in size because it has only a single cathode-ray tube 7. Use of a single tube with a single deflection system also reduces registration error, as compared with an apparatus employing three cathode-ray tubes. The invented apparatus is accordingly easy to adjust in the manufacturing process and highly reliable over its service life.

The resolution of the invented display apparatus is good because the cathode-ray tube 7 is of the monochrome type, not employing a shadow mask. In particular, the resolution of the invented apparatus is much higher than that of present liquid-crystal displays. Cost is low because monochrome cathode-ray tubes are less expensive to manufacture than color cathode-ray tubes, and are much less expensive than liquid-crystal displays.

The scope of the invention allows modifications of the display apparatus described above in regard to the aspect ratio of the monochrome pictures 9a, 9b, 9c, their disposition on the phosphor screen 8, the composition of the phosphor screen 8, and the structure of the optical superimposing means 16. Several representative modifications will be detailed next.

Figure 6:
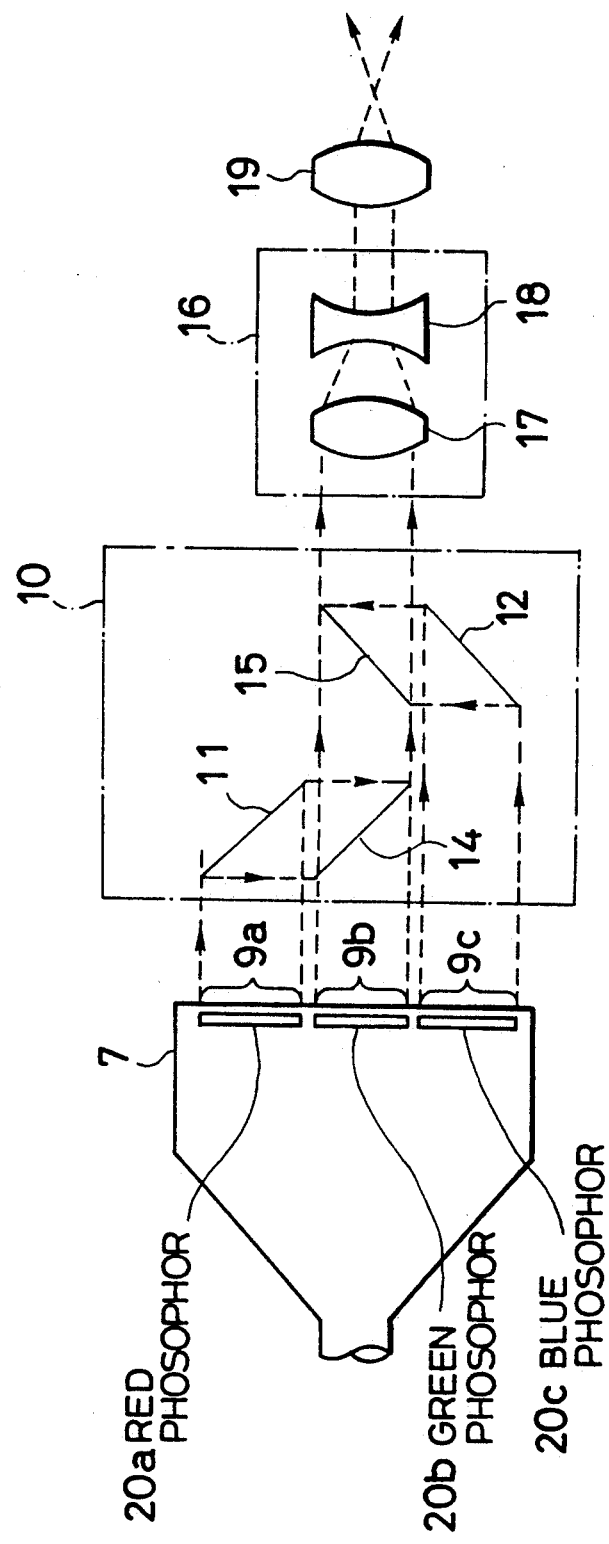
FIG. 6 shows an alternative configuration of the optical superimposing means.

Referring to FIG. 6, the phosphor screen may comprise three distinct portions: a portion 20a coated with a red-emitting phosphor, a portion 20b coated with a green-emitting phosphor, and a portion 20c coated with a blue-emitting phosphor. The red signal is displayed on the red-emitting portion 20a, the green signal on the green-emitting portion 20b, and the blue signal on the blue-emitting portion 20c, forming three monochrome pictures 9a, 9b, and 9c of different primary colors. Since only green light is emitted from the portion 20b, it is not necessary to remove other color components; thus the green-transmitting dichroic mirror 13 can be omitted, reducing the size of the optical superimposing means 10.

Figure 7:
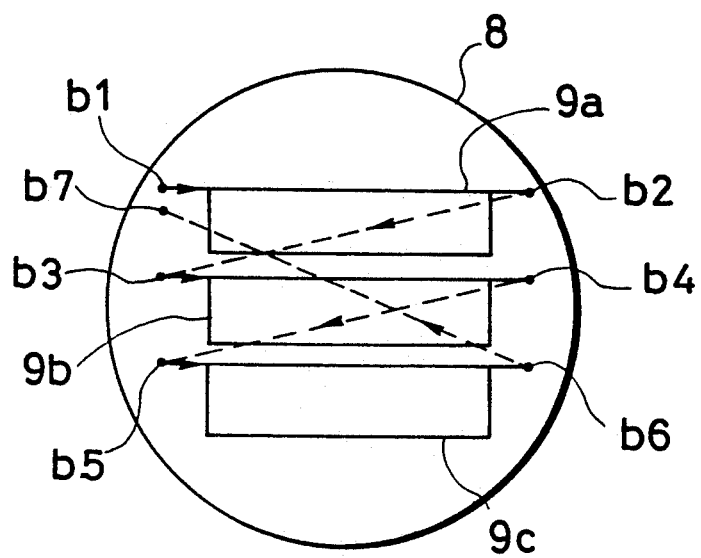
FIG. 7 illustrates another possible disposition of the three monochrome pictures on the phosphor screen.

Referring to FIG. 7, the monochrome pictures 9a, 9b, and 9c may be aligned in the vertical direction, each having a 4:1 aspect ratio. In this case the optical enlarging means 16 enlarges the combined color picture in the vertical direction to achieve a 4:3 aspect ratio. Due to the short persistence time of phosphor materials, a scanning pattern such as b1-b2-b3-b4-b5-b6-b7 is necessary, a single horizontal scan being performed successively in each of the three monochrome pictures 9a, 9b, and 9c. This scheme requires somewhat more complex cathode-ray-tube driving means 4 than the scheme illustrated in FIG. 5, but has the advantage of improved horizontal resolution.

Figure 8:
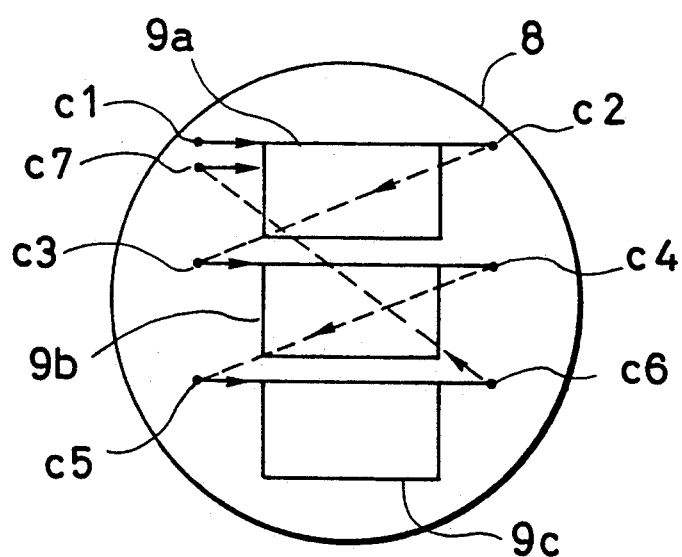
FIG. 8 illustrates still another possible disposition of the three monochrome pictures on the phosphor screen.

Referring to FIG. 8, three monochrome pictures 9a, 9b, and 9c with 4:3 aspect ratios can be displayed in vertical alignment on the phosphor screen 8, using a scanning pattern such as c1-c2-c3-c4-c5-c6-c7. In this case the aspect ratio is already correct, so no enlargement is required; the entire optical enlarging means 16 in FIG. 1 or FIG. 6 can be omitted.

Figure 9:
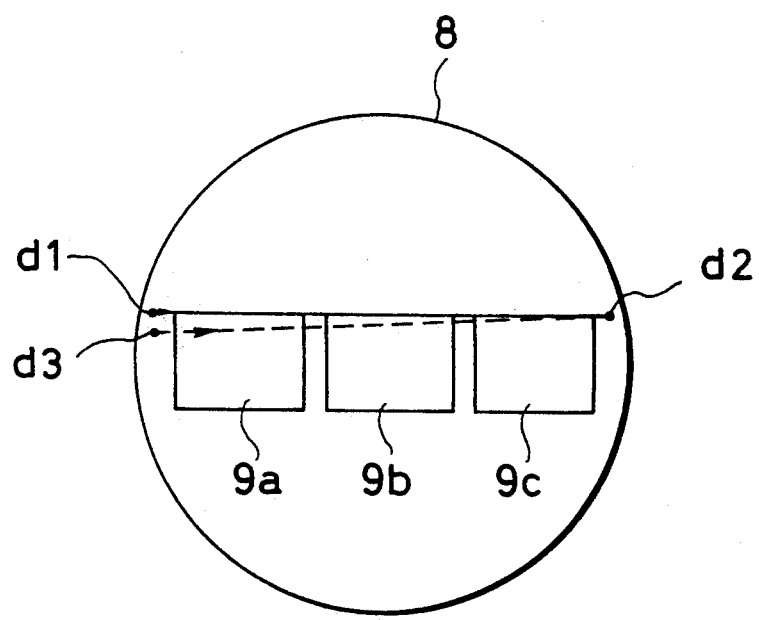
FIG. 9 illustrates yet another possible disposition of the three monochrome pictures on the phosphor screen.

Referring to FIG. 9, three monochrome pictures 9a, 9b, and 9c with 4:3 aspect ratios can be displayed in horizontal alignment on the phosphor screen 8. This arrangement is particularly advantageous: no optical enlarging means is required, and a standard scanning pattern such as d1-d2-d3 can be employed. The cathode-ray tube 7 and its driving means 4 can therefore be identical to the apparatus used in previous monochrome viewfinders. A color viewfinder can be realized at a slight additional cost, by adding signal processing and time-axis compression functions.

Figure 10:
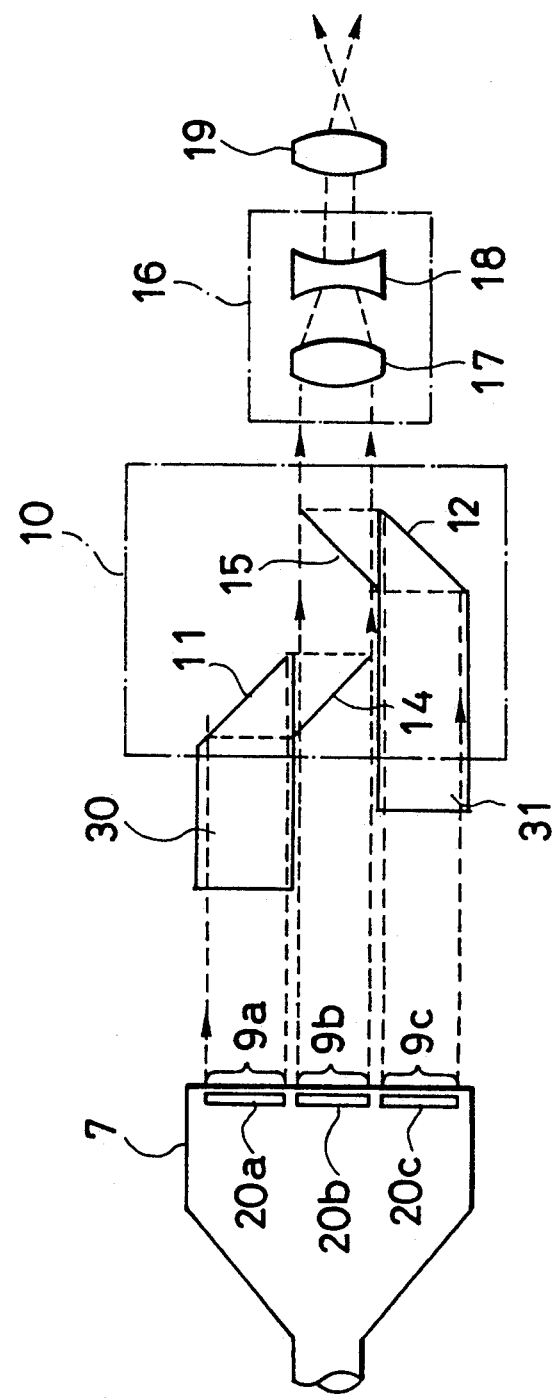
FIG. 10 illustrates another alternative configuration of the optical superimposing means.

Referring to FIG. 10, the optical superimposing system 10 of FIG. 6 can be augmented by placing optically transmitting materials having appropriate indices of refraction in one or more of the light paths from the red-, green-, and blue-emitting portions 20a, 20b, and 20c of the phosphor screen to the optical enlarging means 16. The purpose of these optically transmitting materials is to equalize the optical length of the three paths, so that the red, green, and blue images will be enlarged and focused in the same way by the optical enlarging means 16 and the eyepiece lens 19.

For example, optical transmitting materials 30 and 31 having a comparatively a low index of refraction can be placed in the paths of the red- and blue-emitting portions 20a and 20c, as shown in FIG. 10. This arrangement, with the green-emitting portion 20b located in the center and no extra optically transmitting material disposed in its light path, is preferred because it minimizes distortion of the green component of the picture, which has the greatest effect on perceived resolution.

Although the light paths are drawn longer in FIG. 10 than in FIG. 6, these drawings are schematic in nature. Equalizing the optical lengths of the three paths actually enables these paths to be shortened, reducing the overall size of the apparatus.

Optically transmitting materials can be added to the display apparatus shown in FIG. 1 for the same purpose, and further modifications which will be apparent to those skilled in the art can be made without departing from the spirit and scope of the invention as set forth below.

What is claimed is:

1. A color display apparatus, comprising:
    signal-processing means for extracting red, green, and blue signals from a composite video signal;
    time-axis compression means, coupled to the signal-processing means, for compressing and combining said red, green, and blue signals and adding synchronizing pulses to create a single RGB video signal in which said red, green, and blue signals appear successively in each horizontal scan period;
    a cathode-ray tube coupled to receive said RGB video signal and display said red, green, and blue signals in separate areas as a first monochrome picture, a second monochrome picture, and a third monochrome picture, respectively, said first, second, and third monochrome pictures each having a non-standard aspect ratio;
    optical superimposing means for combining red light from said first monochrome picture, green light from said second monochrome picture, and blue light from said third monochrome picture into a single color picture; and
    enlarging means for enlarging said single color picture to a standard aspect ratio.

2. The apparatus of claim 1, wherein said image enlarging means enlarges said color picture in only one direction.

3. The apparatus of claim 2, wherein said image enlarging means comprises cylindrical lenses.

4. The apparatus of claim 1, wherein said second monochrome picture is disposed between said first monochrome picture and said third monochrome picture.

5. The apparatus of claim 1, wherein said first monochrome picture, said second monochrome picture, and said third monochrome picture are aligned horizontally.

6. The apparatus of claim 5, wherein said cathode-ray tube performs standard scanning.

7. The apparatus of claim 1, wherein said first monochrome picture, said second monochrome picture, and said third monochrome picture are aligned vertically.

8. The apparatus of claim 7, wherein a single horizontal scan is performed successively in said first monochrome picture, said second monochrome picture, and said third monochrome picture.

9. The apparatus of claim 1, wherein said optical superimposing means comprises total reflection mirrors and dichroic mirrors.

10. The apparatus of claim 1, wherein said cathode-ray tube has a white phosphor screen.

11. The apparatus of claim 10, wherein said optical superimposing means comprises:
    a green-transmitting dichroic mirror for transmitting green light from said second monochrome picture;
    a first total reflection mirror for reflecting light from said first monochrome picture;
    a red-reflecting dichroic mirror for combining red light reflected from said first total reflection mirror with light transmitted by said green-transmitting mirror;
    a second total reflection mirror for reflecting light from said third monochrome picture; and
    a blue-reflecting dichroic mirror for combing blue light reflected from said second total reflection mirror with light transmitted by said green-transmitting mirror.

12. The apparatus of claim 1, wherein said cathode-ray tube has a phosphor screen with a red-emitting portion upon which said first monochrome picture is displayed, a green-emitting portion upon which said second monochrome picture is displayed, and a blue-emitting portion upon which said third monochrome picture is displayed.

13. The apparatus of claim 12, wherein said optical superimposing means comprises:
    a first total reflection mirror for reflecting light from said first monochrome picture;
    a red-reflecting dichroic mirror for combining light reflected from said first total reflection mirror with light from said second monochrome picture;
    a second total reflection mirror for reflecting light from said third monochrome picture; and
    a blue-reflecting dichroic mirror for combining light reflected from said second total reflection mirror with light from said second monochrome picture.

14. The apparatus of claim 1, further comprising optically transmitting materials having certain indices of refraction, for equalizing optical lengths of light paths from said first monochrome picture, said second monochrome picture, and said third monochrome picture.

15. The apparatus of claim 14, wherein said optically transmitting materials are disposed in light paths from said first monochrome picture and said third monochrome picture.

16. The apparatus of claim 1, wherein said time-axis compression means comprises:
   three analog-to-digital converter means for digitizing said red, green, and blue signals;
   memory means for storing data output simultaneously from said three analog-to-digital converter means at a first rate;
   digital-to-analog converter means for reading data from said memory means at a second rate equal to three times said first rate and converting said data to an analog signal; and
   synchronizing pulse insertion means, for adding synchronizing pulses to said analog signal to create said RGB video signal.

17. The apparatus of claim 1, also comprising an eyepiece lens for viewing said color picture.

18. A method of displaying a color picture, comprising steps of:
   extracting red, green, and blue signals from a composite video signal;
   compressing said red, green, and blue signals on a time axis;
   combining said red, green, and blue signals into a single RGB video signal;
   adding synchronizing pulses to the RGB video signal;
   displaying the red, green, and blue signals in the RGB video signal as three separate monochrome pictures on a cathode-ray tube, each of the three separate monochrome pictures having a non-standard aspect ratio;
   combining red, green, and blue light from the three separate monochrome pictures to produce a single color picture, and
   enlarging the single color picture to a standard aspect ratio.

19. The method of claim 18, also comprising a step of equalizing optical path lengths of said red, green, and blue light.

* * * * *